(12) United States Patent
Matha et al.

(10) Patent No.: US 11,643,007 B2
(45) Date of Patent: May 9, 2023

(54) VEHICLE EXTERIOR LIGHTING MODULE

(71) Applicant: Volvo Car Corporation, Gothenburg (SE)

(72) Inventors: Paul-Henri Matha, Gothenburg (SE); Jan-Erik Fritzon, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/092,421

(22) Filed: Nov. 9, 2020

(65) Prior Publication Data
US 2021/0155150 A1 May 27, 2021

(30) Foreign Application Priority Data

Nov. 21, 2019 (EP) .................................... 19210552

(51) Int. Cl.
| | |
|---|---|
| *B60Q 1/18* | (2006.01) |
| *F21S 41/151* | (2018.01) |
| *B60Q 1/00* | (2006.01) |
| *B60Q 1/14* | (2006.01) |
| *F21Y 115/10* | (2016.01) |

(52) U.S. Cl.
CPC ............. *B60Q 1/18* (2013.01); *B60Q 1/0035* (2013.01); *B60Q 1/14* (2013.01); *F21S 41/151* (2018.01); *F21Y 2115/10* (2016.08)

(58) Field of Classification Search
CPC .......... B60Q 1/18; B60Q 1/0035; B60Q 1/14; B60Q 1/2692; F21S 41/151; F21S 41/153
See application file for complete search history.

(56) References Cited

U.S. PATENT DOCUMENTS

| 4,556,862 A | 12/1985 | Meinershagen |
|---|---|---|
| 6,238,070 B1 | 5/2001 | Gaelliner et al. |

(Continued)

FOREIGN PATENT DOCUMENTS

| AU | 2006202456 A1 * | 1/2008 |
|---|---|---|
| AU | 2006202456 A1 | 1/2008 |

(Continued)

OTHER PUBLICATIONS

Apr. 27, 2020 European Search Report issued on International Application No. 19210552.

(Continued)

*Primary Examiner* — Evan P Dzierzynski
*Assistant Examiner* — Nathaniel J Lee
(74) *Attorney, Agent, or Firm* — Clements Bernard Walker; Christopher L. Bernard

(57) ABSTRACT

The disclosed subject matter generally relates to a lighting module integrable in a vehicle exterior which can provide sufficient or even improved lighting performance in a cost-efficient way. The proposed lighting module includes an array of light source units that are controllable to provide at least one of low beam light and high beam light, the array of light source units is adapted to extend along a transverse axis of the vehicle across a longitudinal center plane of the vehicle. Accordingly, the present disclosure provides a functional lighting module which can provide at least one of high beam light and low beam light that is arrangeable in the centre portion of the vehicle, between the common locations of the prior art headlamps.

5 Claims, 3 Drawing Sheets

(56) References Cited

U.S. PATENT DOCUMENTS

| | | | |
|---|---|---|---|
| 6,520,669 B1* | 2/2003 | Chen | F21S 43/14 |
| | | | 313/511 |
| 7,445,364 B2 | 11/2008 | Gropp et al. | |
| 2008/0062712 A1* | 3/2008 | Woodward | F21S 41/24 |
| | | | 362/520 |
| 2015/0330588 A1 | 11/2015 | Snyder et al. | |
| 2018/0079352 A1* | 3/2018 | Dalal | H05B 45/50 |
| 2019/0009706 A1* | 1/2019 | Gocke | H04N 9/3141 |

FOREIGN PATENT DOCUMENTS

| | | | | |
|---|---|---|---|---|
| CH | 359988 A1 | 1/1962 | | |
| CN | 101023298 A | 8/2007 | | |
| CN | 201016451 Y | 2/2008 | | |
| CN | 105172950 B | 11/2017 | | |
| CN | 105180053 B | 11/2017 | | |
| CN | 206884861 U | * | 1/2018 | B60Q 1/076 |
| CN | 206884861 U | 1/2018 | | |
| CN | 206968529 U | 2/2018 | | |
| DE | 102006047934 A1 | 4/2008 | | |
| DE | 102011117733 A1 | 5/2013 | | |
| FR | 1101545 A | 10/1955 | | |
| KR | 20130133473 A | 12/2013 | | |
| WO | 2010015058 A1 | 2/2010 | | |

OTHER PUBLICATIONS

Jul. 14, 2022 Office Action issued in corresponding EP Application No. 19210552.6.
Jul. 29, 2022 Office action and search report issued in the corresponding CN application No. 202011308748.X.

* cited by examiner

VEHICLE EXTERIOR LIGHTING MODULE

CROSS-REFERENCE TO RELATED APPLICATION

The present disclosure claims the benefit of priority of co-pending European Patent Application No. 19210552.6, filed on Nov. 21, 2019, and entitled "A VEHICLE EXTERIOR LIGHTING MODULE," the contents of which are incorporated in full by reference herein.

TECHNICAL FIELD

The present disclosure generally relates to a lighting module integrable in a vehicle exterior.

BACKGROUND

Exterior lighting of vehicles serves for illuminating the forward scene of the vehicle for improved visibility for the driver, but also for facilitating for pedestrians and other road users to visually detect the vehicle, as well to understand the driver's intentions via the directional light of the vehicle. Other lighting functions include parking lights which illuminate the surroundings of the vehicle when it is parked.

The illumination distribution from for example headlights of the vehicle depends on various factors such as the distribution of the light sources and reflectors in the headlights, and the light source strength. An improved illumination distribution may provide safer traffic conditions for all road users, and there is therefore a desire to further improve the exterior lighting performance on vehicles.

However, improving the exterior lighting performance is often associated with undesirable increased hardware cost. Therefore, there is also concerns about the cost for the integration of future lighting solutions.

SUMMARY

The disclosed subject matter generally relates to a lighting module integrable in a vehicle exterior which can provide sufficient or even improved lighting performance in a cost-efficient way.

The proposed lighting module includes an array of light source units that are controllable to provide at least one of low beam light and high beam light, the array of light source units is adapted to extend along a transverse axis of the vehicle across a longitudinal center plane of the vehicle.

Accordingly, the present disclosure provides a functional lighting module which can provide at least one of high beam light and low beam light that is arrangeable in the centre portion of the vehicle, between or overlapping with the common locations of the prior art headlamps. In this way, the commonly used prior art dual headlamps may be replaced by a single lighting module arranged across a middle portion in the front part of the vehicle, and still provide at least adequate lighting performance. Thus, the lighting module is adapted to be built in to the vehicle structure to replace at least the traditional high beam and low beam headlights.

The transverse axis is substantially parallel to an axis between a wheel pair of the vehicle. Related to this, the wheels of the wheel pair are coaxially arranged in at least one steering orientation of the vehicle. The vehicle may for example be a car.

In particular, the lighting unit may be a high-definition lighting module. With a high-definition lighting module multiple lighting functions such as low beam and high beam may be provided with a single array of lighting sources which are controllable by a control unit. The control unit may be configured to independently control the light sources units of the array to provide the desired illumination intensity. Using a single high-definition light module as provided by disclosures herein provides for a particularly cost-efficient solution compared to using two prior art modules. Further, a high-definition lighting module enables for a more versatile variation of illumination output patterns.

There is further provided a vehicle lighting system including: left and right exterior lighting devices adapted to be arranged on each side of a longitudinal center plane of the vehicle; and a lighting module including an array of light source units that are controllable provide at least one of low beam light and high beam light, the array of light source units is adapted to extend along a transverse axis of the vehicle across a longitudinal center plane of the vehicle, the transverse axis being substantially parallel to an axis between a wheel pair of the vehicle.

Further features of, and advantages with, the embodiments of the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF DRAWINGS

These and other aspects of the present disclosure will now be described in more detail, with reference to the appended drawings showing example embodiments, wherein.

DETAILED DESCRIPTION

Figure 1:
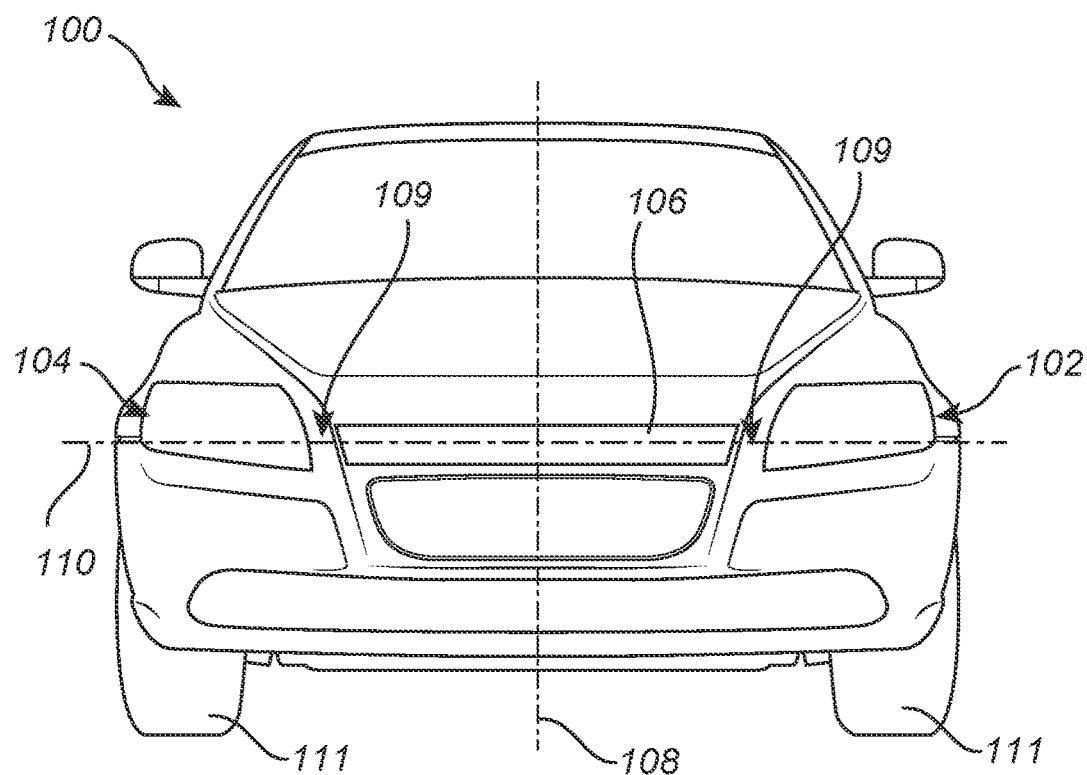
FIG. 1 conceptually illustrates a vehicle front structure including a lighting module according to embodiments of the present disclosure.

In the present detailed description, various embodiments of a lighting module according to the present disclosure are described. However, the lighting module may be embodied in many different forms and should not be construed as limited to the embodiments set forth herein; rather, these embodiments are provided for thoroughness and completeness, and to fully convey the scope of the present disclosure to the skilled person. Like reference characters refer to like elements throughout.

FIG. 1 conceptually illustrates a vehicle front structure 100 including a left exterior lighting device 102 and a right exterior lighting device 104. The exterior lighting devices 102 and 104 may for example include at least one of direction lights, parking lights, or indication lights of the vehicle front structure 100. In possible implementations, the exterior lighting devices 102 and 104 may be headlamps. Further, FIG. 1 conceptually illustrates a lighting module 106 integrable in the vehicle exterior, here the lighting module 106 is integrated in the vehicle front structure 100. The lighting module 106 includes an array of light source units that are controllable to provide at least one of low beam light and high beam light. The array of light source units being adapted to extend along a transverse axis 110 of the vehicle across a longitudinal center plane 108 of the vehicle, the transverse axis 110 being substantially parallel to an axis between a wheel pair 111 of the vehicle.

The output lighting performance of a low beam or high beam lighting function may be at least maintained in a cost-efficient way, by allowing the lighting module to be arrangeable in a centre portion of the vehicle front structure. This means that the lighting module extends across the longitudinal center plane 108 of the vehicle. Preferably, the lighting module is of sufficient width to reach substantially the entire distance between the left exterior lighting device 102 and the right exterior lighting device 104. However, a small gap 109 is allowed between the lighting module 106 and the left exterior lighting device 102 and the right exterior lighting device 104. The lighting module 106 may thus be adapted to be arranged as a center lighting module between left 104 and right 102 exterior lighting devices of the vehicle. A small gap 109 may be about 300 mm, or about 250 mm, or about 200 mm, or about 150 mm, or about 100 mm.

By developing a center lighting module that is arrangeable in the center of the vehicle front, it becomes possible to use a single lighting module instead of two, thereby providing a cost-efficient implementation of high beam and low beam light. Embodiments of the present disclosure are particularly advantageous when the lighting module is a high-definition lighting module which are relatively costly. Accordingly, embodiments of the lighting modules provided herein may also extend across the locations of and thereby replace the the left exterior lighting device 102 and the right exterior lighting device 104.

The lighting module integrable in the vehicle exterior meaning that it is not intended to be mounted on an exterior surface of the vehicle, rather, the lighting module forms an integral part of the vehicle.

The array of light of light source units may be a continuous array across the longitudinal center plane 108.

The longitudinal center plane 108 is a virtual plane that lies along the rear-front direction of the vehicle and thus conceptually divides the vehicle in half, defining a left and right part, each including the respective left exterior lighting device 102 and the right exterior lighting device 104. The transverse axis 110 may be perpendicular to the center plane 108.

The array or light source units may be two-dimensional array. The array of light source units is preferably arranged in a housing and is covered by a lens, as is common in traditional headlamps. The array extends across the center plane 108 of the vehicle, in other words, one portion of light source units is arranged on one side of the center plane 108, and another portion of the light source units is arranged on the other side of the center plane 108.

In embodiments, the left exterior lighting device 102 and the right exterior lighting device 104 may be configured to provide direction lights. The high beam and/or low beam functionality may be provided only by the lighting module 106 integrable in the vehicle exterior. Thereby, leaving as few lighting functions as possible to the left exterior lighting device 102 and the right exterior lighting device 104.

In embodiments, the left exterior lighting device 102 and the right exterior lighting device 104 may be configured to provide low beam light, and not high beam light.

The lighting module 106 is arranged as a centre lighting module arranged between the left exterior lighting device 102 and the right exterior lighting device 104 of the vehicle. Accordingly, the center lighting module 106 may cooperate with the left exterior lighting device 102 and the right exterior lighting device 104 to provide a light output. The lighting module 106, the left exterior lighting device 102, and the right exterior lighting device 104 may be arranged in the same plane parallel with the transverse axis 110.

In view of the above, the lighting module may be adapted to be arranged as a center lighting module between a left exterior lighting device and a right exterior lighting device of the vehicle.

The lighting module 106 may provide one, or both of a high beam light and low beam light. Thus, the light source units in the array may be independently controllable by a control unit for providing at least one of high beam light and low beam light. In one embodiment, the lighting module 106 includes an array of low beam light sources units adapted to extend in a transverse direction of the vehicle across a longitudinal center plane 108 of the vehicle.

Figure 2:
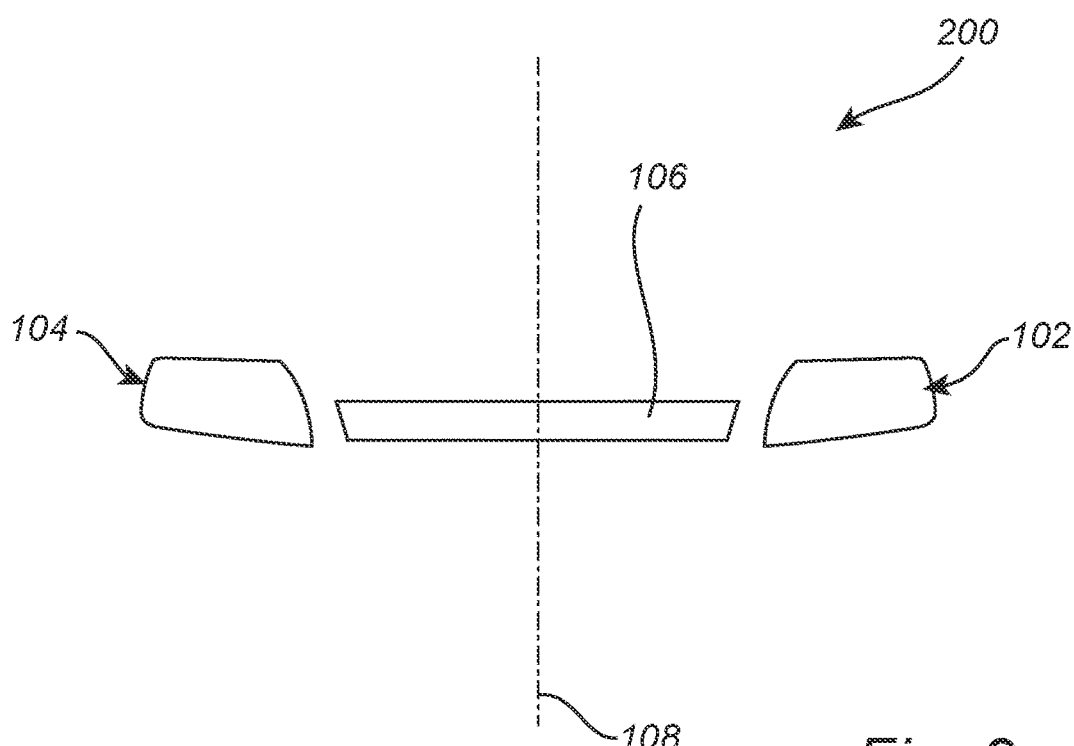
FIG. 2 conceptually illustrates an example vehicle lighting system including a lighting module according to embodiments of the present disclosure.

FIG. 2 illustrates an example vehicle lighting system 200 according to embodiments of the present disclosure, including left 102 and right 104 exterior lighting devices adapted to be arranged on each side of a longitudinal center plane 108 of the vehicle. The vehicle lighting system 200 includes the lighting module 106 adapted to extend along a transverse axis of the vehicle across a longitudinal center plane 108 of the vehicle.

Figure 3:
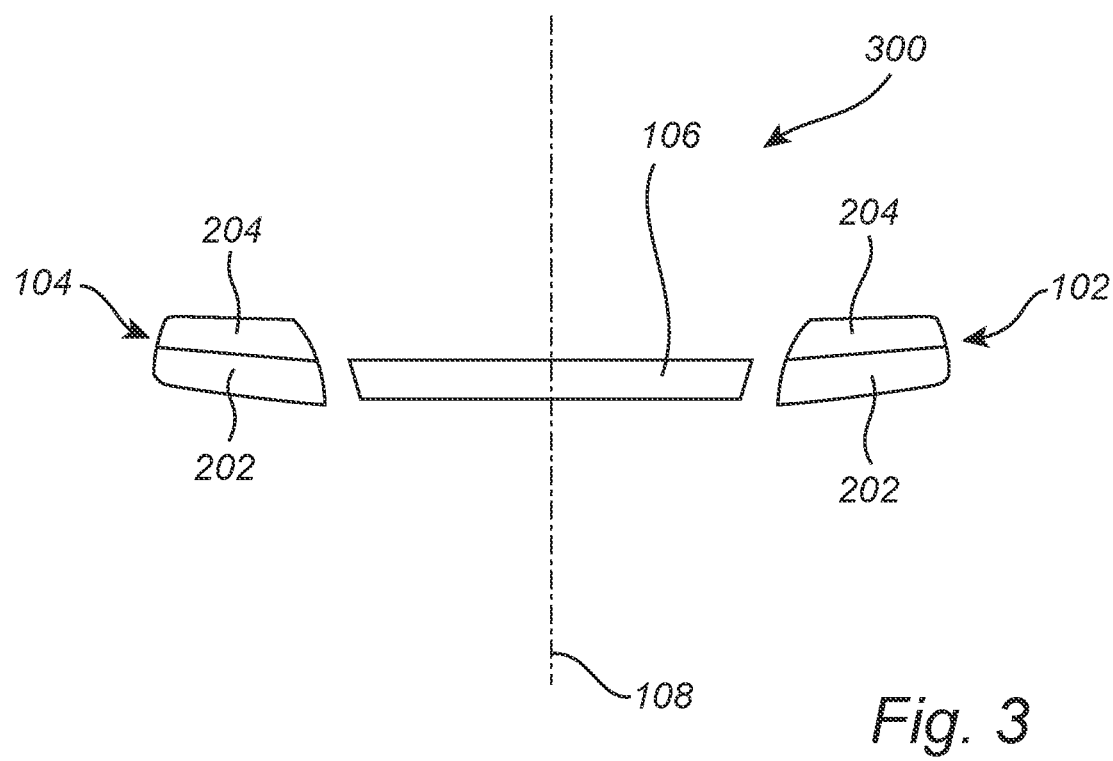
FIG. 3 is a conceptually illustrates an example vehicle lighting system including a lighting module according to embodiments of the present disclosure.

FIG. 3 illustrates an example vehicle lighting system 300, where the left 102 and right 104 exterior lighting devices each include a low beam and/or high beam light source 202 and a direction light source 204. In one embodiment, the left 102 and right 104 exterior lighting devices each include a low beam light source 202 and the direction light source 204. Further, the center lighting module 106 may in this embodiment include an array of light source units controllable to provide both high beam and low beam light. Thereby, relatively simple light sources may be used in the left 102 and right 104 exterior lighting devices to provide the often legally required lights at the left and right sides of the vehicle front, the lighting module 106 may be a high-definition light module to provide programmable high beam and low beam lights in the center of the vehicle front.

Figure 4:
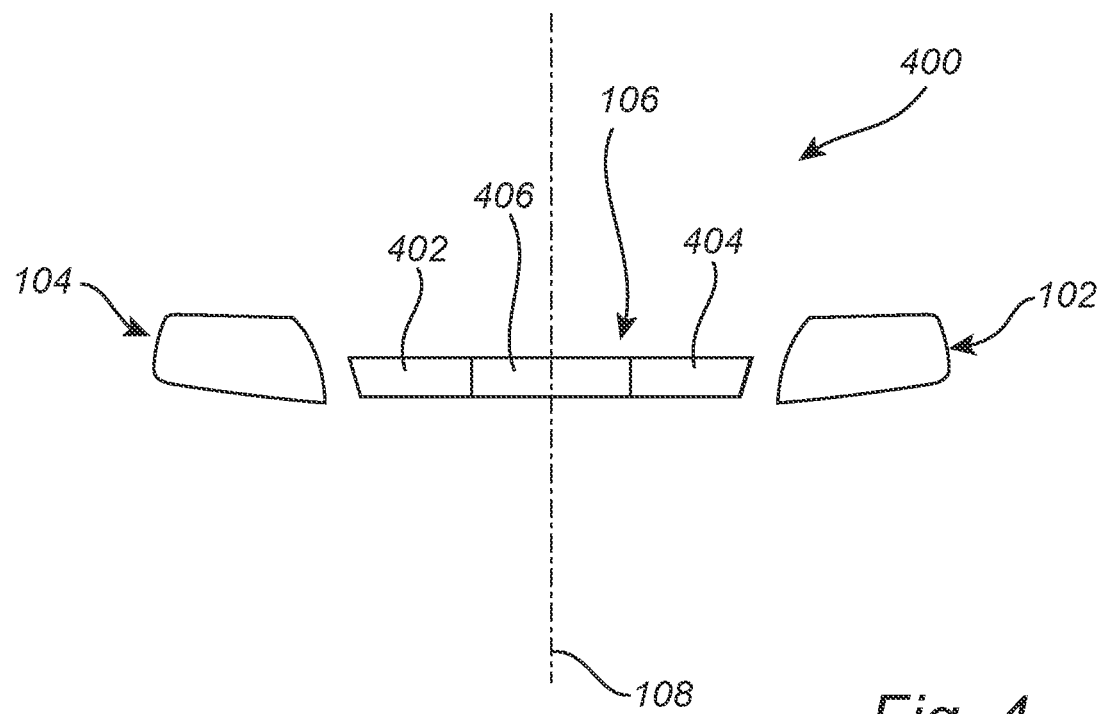
FIG. 4 conceptually illustrates an example a vehicle lighting system according to embodiments of the present disclosure.

FIG. 4 illustrates an example vehicle lighting system 400 including a lighting module according to embodiments of the present disclosure. The lighting module 106 may be a high-definition lighting module 106 including an array of light source units that are individually controllable by a control unit to provide a desired illumination. This may for example allow for providing at least one high beam light source 402 including a portion of light source units arranged on one side of the longitudinal center plane 108 of the vehicle, and at least one high beam light source 404 including a portion of light source units arranged on the other side of the longitudinal center plane 108 of the vehicle. The light source units of the light sources 402, 404, 406 along the entire width of the lighting module 106 may be controlled to provide low beam light. In embodiments, the center portion 406 the of the lighting module intercepting with the longitudinal center plane 108 includes light source units that are configured to provide only low beam light. Thus, a control unit controls the light source units of the portions 402 and 404 to provide high beam light when requested, and the light source units of the portion 406 to provide low beam light when requested.

Preferably, the light source units in the array are independently controllable by a control unit for providing at least one of high beam light and low beam light.

Preferable, the lighting module may be a high-definition lighting module including the plurality of light source units.

The array of light source units of the high-definition lighting module may be controllable by a control unit to thereby, in a predetermined way provide the desired light output. The control unit may be included in the control unit, alternatively the control unit is an electronic control unit of the vehicle. The light sources of the array may be controllable to jointly provide high beam light and low beam light. In other words, the same light source may be controlled for providing both high beam and low beam light.

The light source units may be light emitting diodes, although other light source units are also conceivable.

There is further provided a vehicle including a lighting module according to any one of the herein directly or indirectly disclosed embodiments.

Figure 5:
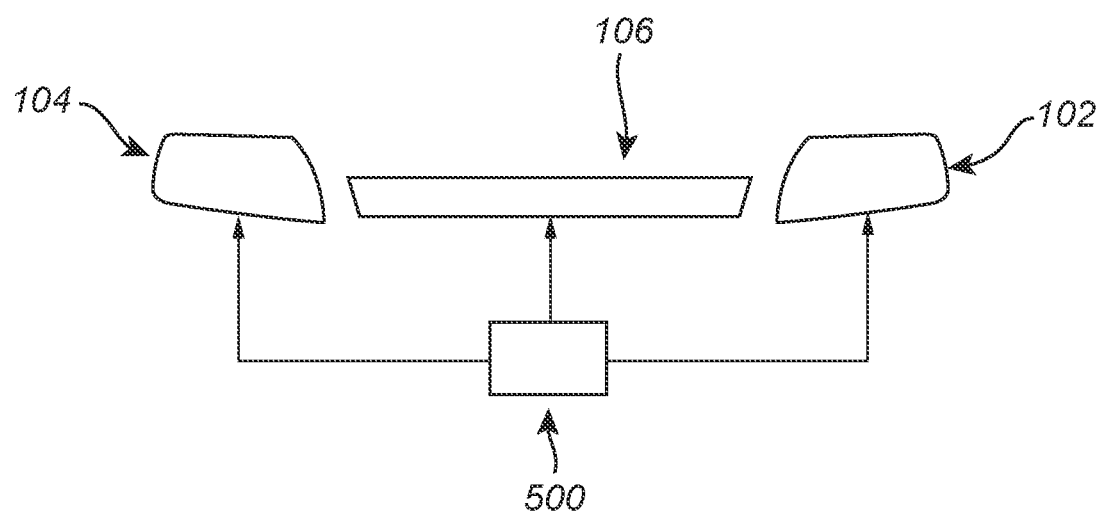
FIG. 5 conceptually illustrates a control unit configured to control the light sources of a lighting module according to embodiments of the present disclosure.

FIG. 5 conceptually illustrates a control unit 500 configured to control the light source units in the array of light source units of a lighting module 106 according to embodiments of the present disclosure. The control unit 500 may control the individual lights sources units in the array to jointly in groups of light source units provide high beam and/or low beam light output. Accordingly, the control unit may transmit control electronic signals to the lighting module 106 light source units to thereby control the light output emitted by the light source units. In this way may nearly arbitrary light output patterns be emitted by the lighting module 106 as controlled by the control unit 500, in particular if the lighting module 106 is a high-definition lighting module. A high-definition module includes a plurality of light source units, e.g. pixels, in a matrix. The number of pixels is preferably larger than 50, or larger than 100, or larger than 300, or larger than 700, or larger than 1000, or larger than 10000, or larger than 1000000. The number of pixels may be about 100, or about 1000, or about 2000, or about 5000, or about 10000, about 100000, or about 1000000, or about 1500000, or about 2000000. The pixels may be provided as individual light emitting diodes or as micro-mirrors, e.g. MEMS-mirrors, that reflect light from a light source.

Other possible light source units within the scope of the present disclosure are halogen light sources.

The lighting module may have an elongated shape in which the height is smaller than width, preferably the height is less than half the width, or less than 20% of the width, such as about 10%-15% of the width. The outline of the lighting module may be different form the depicted embodiments, for example the outline may be rhomb-shaped, rectangular, or generally polygonal-shaped, etc.

Figure 6:
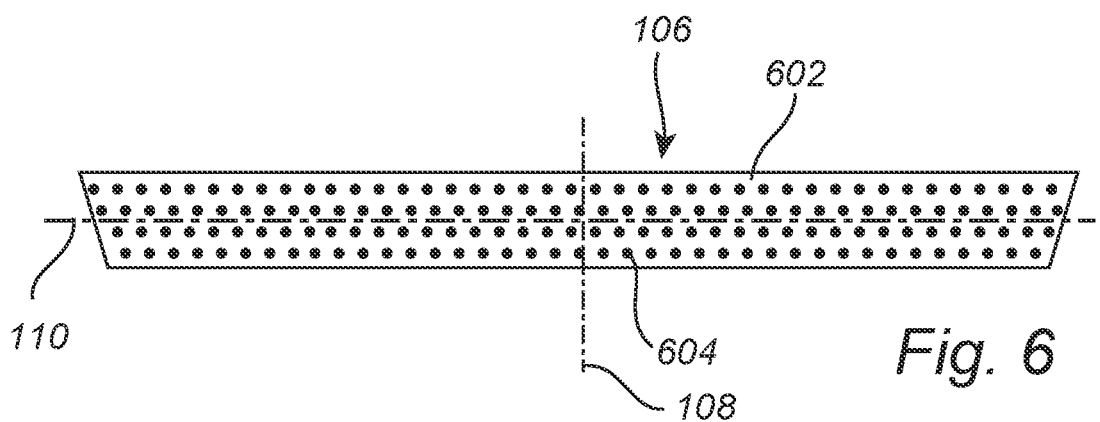
FIG. 6 conceptually illustrates an example lighting module according to embodiments of the present disclosure.

FIG. 6 is a conceptual close-up view of the lighting module 106 including a two-dimensional array 602 of light source units 604. The light source units 604 are arranged in a regular pattern but may be arranged in any custom pattern depending on the specific implementation. The light source units 604 are controllable to provide a light output in the form of low beam light and/or high beam light. For this, a control unit, see FIG. 5, may control a power source to power selected light source units 604 depending on which mode, high beam or low beam is desirable. Thus, the control unit may control individual light source units 604 to output light with a controllable intensity. In embodiments, at least one of the light source units is controllable for providing low beam light and high beam light. In other words, there may be light source units that are configured for providing both high beam light and low beam light. Thus, it is possible that light source units have overlapping functionality thereby providing for a more cost-efficient lighting module.

Figure 7:
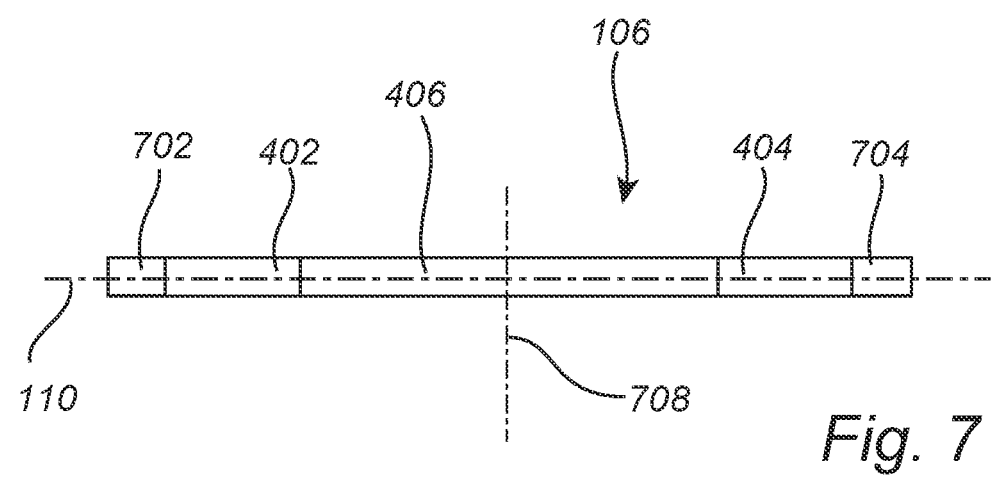
FIG. 7 conceptually illustrates an example lighting module according to embodiments of the present disclosure.

FIG. 7 schematically illustrates a further embodiment of a lighting module 206. In this embodiment, the lighting module 206 includes distal portions 702 and 704 of light source units arranged further from a center axis 708 of the lighting module than the portions 402, 404 of light source units arranged for high beam light, wherein one distal portion 702, 704 is arranged on each side of the center 708 of the lighting module, wherein the distal portions of light source units are configured for providing at least directional lighting. This lighting module 206 may provide a complete solution for the front lighting for a vehicle and may thus replace the headlights and directional lights, and even parking lights, etc., with a single lighting module 206.

The center axis 708 may coincide, with the longitudinal center plane 108 of the vehicle when the lighting module is installed in a vehicle. The center axis 708 may lie in the longitudinal center plane 108 when the lighting module is installed in a vehicle.

The distribution of the portions 402, 404, 406, 702, 704 of light source units is symmetric with respect to the center axis 108. In other words, the portions of light sources units are symmetrically arranged with respect to the center of the lighting module.

Generally, the portions of light source units, e.g. the distal portions, the center portion, and the portions for high beam light, may be sub-arrays of light sources units of the main array 602 of light source units 604.

The array of light source units may be a continuous array that reaches across the entire lighting module. Thus, the portions 402, 404, 406, 702, 704 of light source units are directly neighboring without gaps between neighboring portions absent of light source units that are configured to emit light.

However, in other possible implementations, there may be gaps between the portions 402, 404, 406, 702, 704 of light source units that are absent of light source units.

High beam light and low beam light are per se known to the skilled person. However, for sake of completeness, a low beam light generally has lower light intensity than high beam light.

That the lighting module is integrable in the vehicle exterior, such as the vehicle front structure, means that the lighting module is part of the vehicle front structure and is not attached to the vehicle front structure as an external lighting part.

The vehicle is preferably a light duty vehicle such as a car.

The communication between the control unit and other devices, systems, or components may be hardwired or may use other known electrical connection techniques, or wireless networks, known in the art such as via CAN-buses, Bluetooth, Wifi, Ethernet, 3G, 4G, 5G, etc.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may include modules in either hardware or software, or partially in hardware or software and communicate using known transmission buses such as CAN-bus and/or wireless communication capabilities.

A control unit of the present disclosure is generally known as an ECU, electronic control unit.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:
1. A vehicle comprising:
left and right exterior lighting devices arranged on each side of the longitudinal center plane of the vehicle;
a lighting module arranged as a center lighting module between and on the same axis as the left and right exterior lighting devices, the lighting module reaching substantially the entire distance between the left and right exterior lighting devices, the lighting module being a high-definition lighting module including at least 1000 light source units in the form of pixels in a single continuous matrix, the pixels of the single continuous matrix being independently controllable and comprising a portion of pixels arranged on one side of the longitudinal center plane of the vehicle for providing high beam light and a portion of pixels arranged on another side of the longitudinal center plane of the vehicle for providing high beam light, wherein pixels in a center portion of the single continuous matrix are configured to provide only low beam light, the single continuous matrix extending along a transverse axis of the vehicle across the longitudinal center plane of the vehicle, the transverse axis being substantially parallel to an axis between a wheel pair of the vehicle, and
a control unit that controls individual light source units to output light with a controllable intensity so that each light source unit that provides high beam light can additionally provide low beam light.

2. The vehicle lighting system according to claim 1, wherein the left exterior lighting device and the right exterior lighting device include at least direction lights.

3. The vehicle according to claim 1, wherein the lighting module comprises distal portions of light source units arranged further from a center of the lighting module than the portion of light source units arranged for high beam light, wherein one distal portion is arranged on each side of the center of the lighting module, wherein the distal portions of light source units are configured for providing at least directional lighting.

4. The vehicle according to claim 1, wherein the portions of light source units are symmetrically arranged with respect to the center of the lighting module.

5. The vehicle according to claim 1, wherein light source units are light emitting diodes.

* * * * *